United States Patent

Pickard

[15] 3,660,089

[45] May 2, 1972

[54] PRINTING PLATE PROCESSING METHOD

[72] Inventor: John E. Pickard, Selma, Ind.

[73] Assignee: Ball Brothers Company Incorporated, Muncie, Ind.

[22] Filed: Dec. 24, 1969

[21] Appl. No.: 889,827

Related U.S. Application Data

[62] Division of Ser. No. 543,675, Apr. 19, 1966, Pat. No. 3,528,358.

[52] U.S. Cl. ....................96/48 R, 96/33

[51] Int. Cl. ....................GO3c 5/24

[58] Field of Search ....................95/89 R, 89 G, 94 R, 96, 97; 134/88, 89; 118/312, 326, 603; 96/33, 48

[56] References Cited

UNITED STATES PATENTS

| | | | |
|---|---|---|---|
| 3,000,288 | 9/1961 | Winnek | 95/89 |
| 3,059,560 | 10/1962 | Gutzmer | 95/89 |
| 3,088,391 | 5/1963 | Sigler | 95/93 |

FOREIGN PATENTS OR APPLICATIONS

| | | | |
|---|---|---|---|
| 692,498 | 8/1964 | Canada | 95/89 |

*Primary Examiner*—Samuel S. Matthews
*Assistant Examiner*—Fred L. Braun
*Attorney*—Campbell & Harris and Campbell, Harris & O'Rourke

[57] ABSTRACT

Method for developing and desensitizing lithographic plates having latent images in the form of a polymer coating of varying solubilities in differing areas by dispersing a solvent or desensitizer onto the plate, drying the plate, removing dissolved impurities from the solvent in situ, preferably by distilling the solvent, and returning the purified solvent to a reservoir for re-use.

14 Claims, 8 Drawing Figures

PRINTING PLATE PROCESSING METHOD

This application is a Divisional application of John E. Pickard, application Ser. No. 543,675, filed Apr. 19, 1966, now U.S. Pat. No. 3,528,358.

This invention relates to a method and apparatus for processing printing plates and, more particularly, relates to a method and apparatus for developing and desensitizing lithographic plates.

Printing by means of the planographic process, for example, has been known and used for many years, and with the advent of new base materials, such as metal, plastic, and paper, this process became an even more important factor in the printing industry. As is well known in the art, such a lithographic plate is commonly prepared for printing by applying a resist coating on a surface thereof, usually a light-sensitive resist, such as, for example, a light sensitive polymeric material as described in U.S. Pat. No. 2,610,120, which coating is then exposed to light through a pattern to fix, or harden, those portions of the coating exposed to light, after which the unexposed portions of the coating are removed by developing the plate, utilizing a suitable developing solvent, and the plate then desensitized utilizing a suitable desensitizing solvent.

The image produced on a lithographic plate by developing and desensitizing is due to the differential solubility of the resist coating caused by light exposure. Such differential solubility could also be attained by application of other energy forms, such as heat, for example, and image formation by developing resist coatings having differential solubility can also be used for other plates, such as, for example, engraving plates and plates for printed circuits.

While attempts have been made heretofore to provide suitable processing apparatus and method for processing a plate having a resist coating with portions of differential solubility with respect to other portions, no completely successful apparatus or method has heretofore been found. Of the known processes and apparatus, lack of complete acceptability has usually resulted from a long processing time requirement, lack of uniformity resulting in underdevelopment or overdevelopment (particularly in hand development), difficulty in handling large plates, short printing life of plates, failure to control toxic solvents with accompanying loss of solvent, or lack of quality due, for example, to such things as streaks or smears on the plate or failure in maintaining the desired portions of the coating intact while removing the undesired portions to thus damage the image on the plate.

It is a feature of this invention to provide an improved processing apparatus and method which overcomes the difficulties experienced in prior apparatus and methods of this general type, and more specifically, to provide improved apparatus and method for developing and desensitizing a plate wherein solvent is sprayed over the plate and the plate thereafter quickly dried.

While spraying developing solvent on the surface of a plate to develop the same is known in the art, and is taught, for example, in U.S. Pat. No. 2,865,750, where spraying is used in conjunction with vapor to develop a plate, no known apparatus utilizing only a solvent spray to contact the resist, has proven to be successful in consistently producing superior quality plates having long press life.

It is therefore an object of this invention to provide an improved apparatus and method for processing plates.

It is another object of this invention to provide an apparatus and method for quickly developing plates wherein developing solvent is sprayed over each plate to remove all undesired portions of the coating and the plate then quickly dried to consistently produce superior quality plates.

It is another object of this invention to provide an improved plate developing process and apparatus wherein developing solvent is repeatedly dispersed in a thin layer over the plate to develop the plate without causing smears, streaks and the like.

It is another object of this invention to provide a lithographic plate processing apparatus and method wherein each plate is developed and then desensitized in a manner so as to provide a superior quality plate.

It is still another object of this invention to provide a lithographic plate developing apparatus and method wherein the plate is developed in a closed chamber and the solvent used recovered and processed for re-use.

With these and other objects in view which will become apparent to one skilled in the art as the description proceeds, this invention resides in the novel method and apparatus substantially as hereinafter described, and more particularly defined by the appended claims, it being understood that such changes in the precise embodiments of the herein disclosed invention are meant to be included as come within the scope of the claims.

The accompanying drawings illustrate a complete embodiment of the invention, together with alternate embodiments of portions thereof, according to the best mode so far devised by the practical application of the principles thereof and in which.

Figures 1, 2:
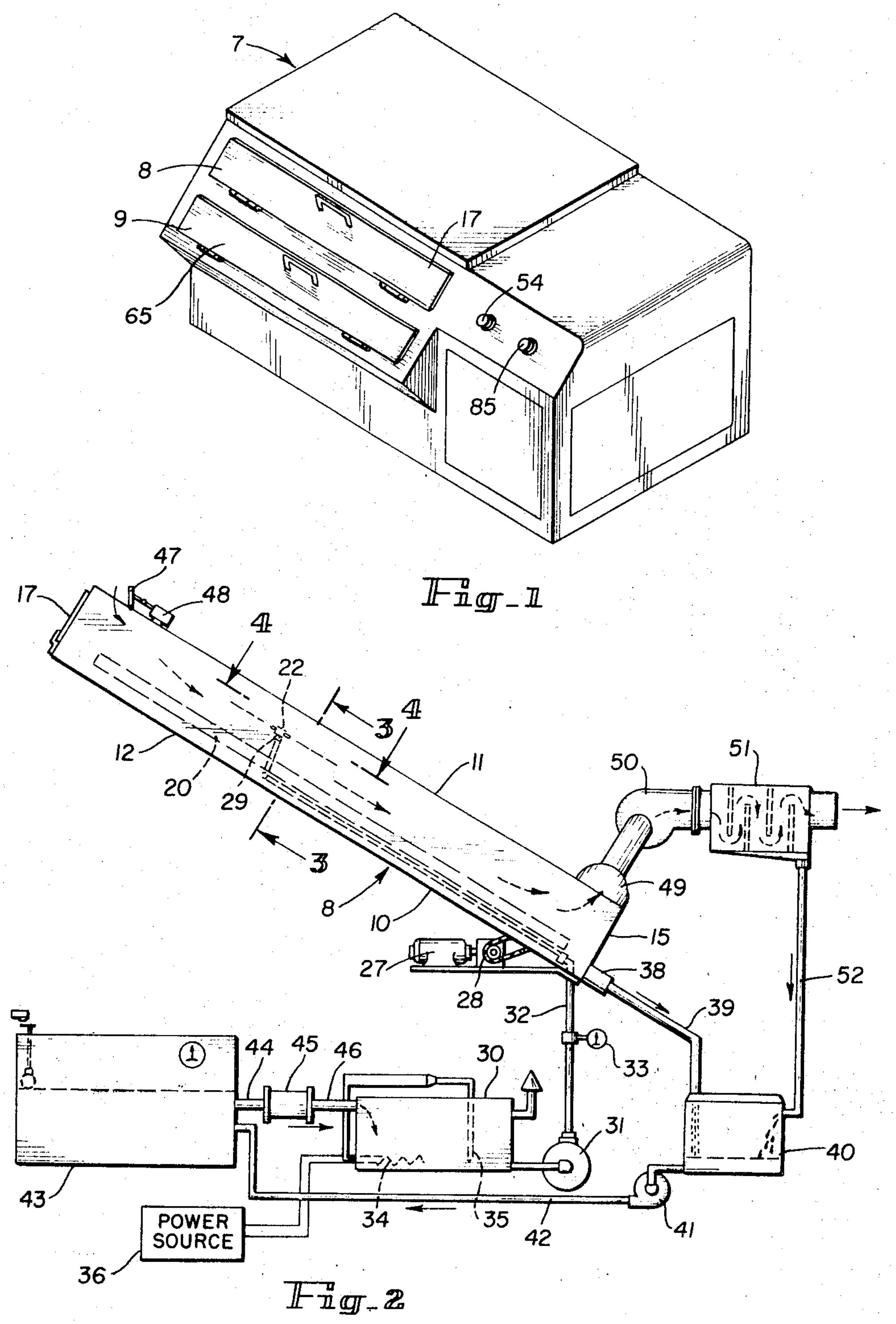
FIG. 1 is a perspective view of a processing unit including both developing and desensitizing apparatus.
FIG. 2 is a schematic presentation illustrating the lithographic plate developing apparatus of this invention included in the processing unit shown in FIG. 1.

Referring now to the drawings, in which like numerals have been used for like characters throughout, the numeral 7 refers generally to a plate processing unit, which unit may include both plate developing apparatus 8 and desensitizing apparatus 9.

Figures 3, 4, 5:
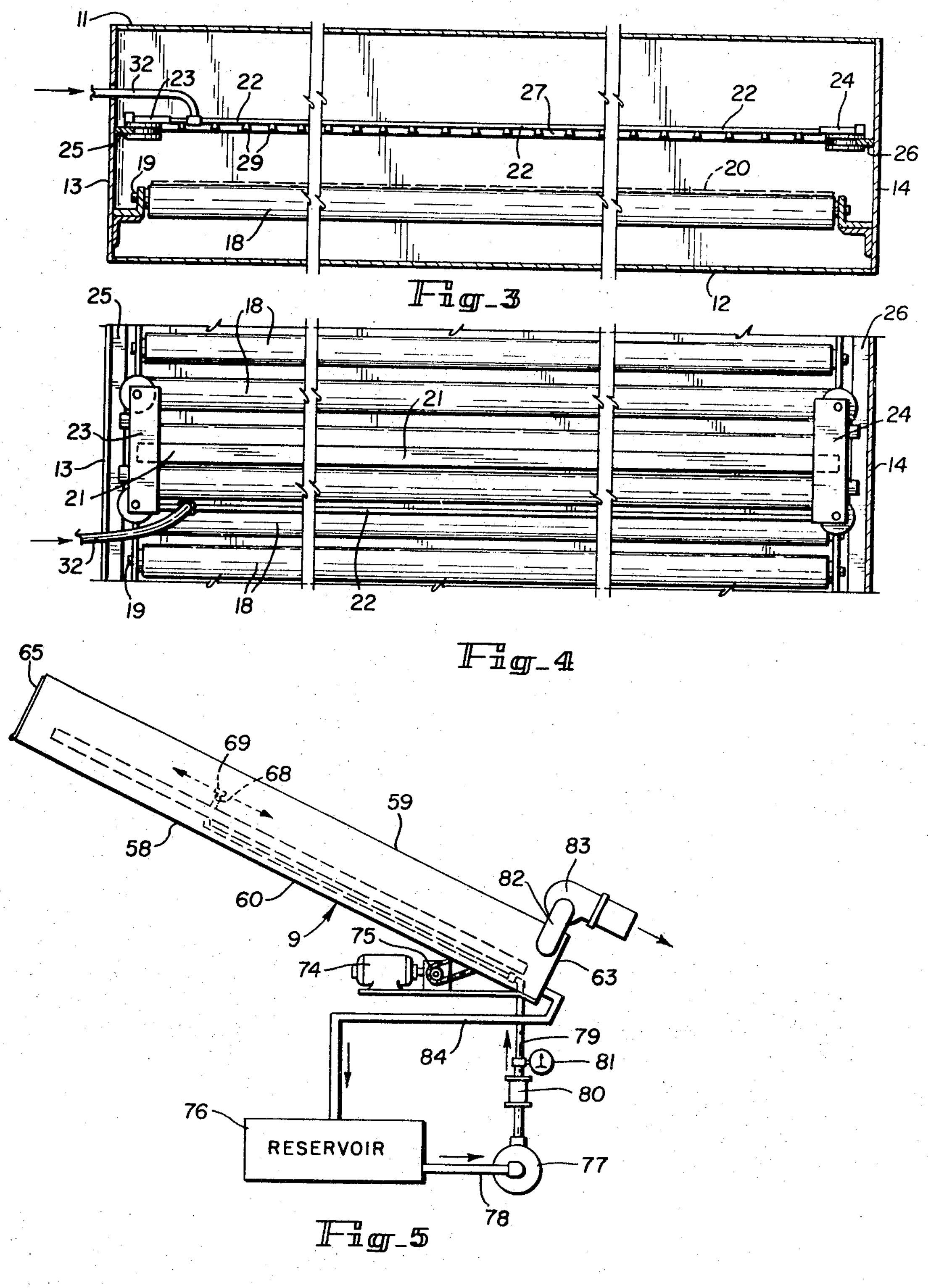
FIG. 3 is a partial cross-sectional view of the plate developing apparatus taken through the plane of lines 3—3 in FIG. 2.
FIG. 4 is a partial horizontal section view of the plate developing apparatus taken through the plane of the lines 4—4 in FIG. 2.
FIG. 5 is a schematic presentation of the lithographic plate desensitizing apparatus of this invention included in the processing unit of FIG. 1.

Lithographic plate developing apparatus 8, as shown best in FIGS. 2, 3, and 4, includes a developing chamber 10 defined by top and bottom walls 11 and 12, respectively, side walls 13 and 14, lower end wall 15 and a door 17. Door 17 is outwardly and downwardly swinging, is mounted conventionally at the upper end of the developing chamber, and is of a size sufficient to allow lithographic plates to be inserted into and removed from the developing chamber when the door is in an open position.

As shown in FIGS. 3 and 4, a plurality of freely rotatable rollers 18 are spaced along fixed horizontal rods 19 within chamber 10 near the bottom wall 12 thereof. Rollers 18 support the plate, indicated generally by the numeral 20, while in chamber 10, and facilitate inserting and removing the plate. If desired, of course, other supports, such as spaced bars or angle irons, for example, could be utilized equally well. Plate 20 is inserted into the developing chamber with the coated side facing upwardly both for developing purposes and so that the coating is not damaged by contact with the supports. Preferably, stops (now shown) should be provided near the lower end wall 15 to position the plate within chamber 10.

A spray bar 22 is spaced upwardly from the coated surface of plate 20 within chamber 10 and near the top wall 11 of said chamber. Spray bar 22 is horizontally positioned and extends substantially across the chamber to blocks 23 and 24 at opposite sides of the chamber and a stabilizing bar 21, as shown in FIG. 4, extends between said blocks. Blocks 23 and 24 are movably mounted on flanges, or plates, 25 and 26, respectively. Spray bar 22 also has a plurality of downwardly projecting spray heads, or nozzles, 29 thereon, said spray heads being spaced so as to assure that the developing solvent is uniformly sprayed in a thin layer onto the coated surface of the lithographic plate therebelow. Spray bar 22 is reciprocated within chamber 10 by electric motor 27 which controls movement of blocks 23 and 24 through a conventional drive 28, such as, for example, a belt and chain drive.

The spraying apparatus described hereinabove could be modified to accomplish the same end, if desired, for example, by replacing the transverse spray bar with a plurality of spray heads fixedly mounted on top wall 11, the number of heads required being dictated by the total area of the chamber rather than the width as is the case when the reciprocatable spray bar or its equivalent is utilized. The spraying apparatus could be further modified, if desired, by placing the plate near the top of the developing apparatus and the spray system near the bottom to spray uniformly into contact with the plate.

Developing solvent in liquid form is supplied to the spray heads through the spray bar from a clean solvent reservoir 30 by means of a pump 31 and tubing 32 (part of which is flexible to allow movement of the spray bar). If desired, a pressure gauge 33 can be inserted in the tubing 32 near pump 31. Reservoir 30 is a heated reservoir and can be heated in a conventional manner such as, for example, by an electric heater 34, controlled in conventional fashion by a thermostat 35 connected in the line to a conventional power source 36.

Reservoir 30 is preferably maintained at a temperature of between 140° and 160° F., so that the spray is at an elevated temperature when it comes into contact with the plate, and should have a minimum capacity to hold 24 gallons of solvent when used with a chamber capable of developing plates up to about 3,000 square inches. This capacity will allow approximately 1½ hours of normal plate developing time before the solvent must be replenished (although the supply may be constantly automatically replenished as brought out more fully hereinafter).

It has been found preferable to maintain the coated surface of the lithographic plate at an angle with respect to horizontal, and preferably inclined at an angle of about 30°. It has been also found that about 25 psi to 37 psi fluid pressure using a 1/8 K.S.S. 1.0 nozzle provides excellent developing results with a spacing between nozzles of four inches and a spacing between nozzle and plate of about 2 to 4 inches. The spray nozzles are downwardly directed and preferably set at an angle with respect to the plate to be developed so that the spray impinges on the plate at an angle of between 60° and 80° with an angle of 70° being preferred. A 60-inch wide plate would normally require 16 nozzles, or spray heads, and at 25 psi fluid pressure, would deliver about 2.48 gallons of solution per minute to the plate being developed.

It is to be appreciated, of course, that the size of nozzles, pressure and spacing between nozzles and plate can be varied so long as solvent is dispersed over the surface of the plate with sufficient pressure to dislodge and carry off the undesired portions of the plate coating (i.e., the unhardened portions when a light sensitive resist coating is used) but without dislodging the desired portions of the coating (i.e., the hardened or fixed portions when a light sensitive resist coating is used). By way of example, 1/8 K.S.S. 0.75 nozzles placed 3 inches apart at 28 psi fluid pressure have been tried and found to work well in developing plates when said nozzles are about 2 inches from the plate.

As stated hereinabove, the developing solvent utilized depends upon the type of coating applied to the plate since the developing solvent must have the capability of dislodging the undesired portions of the coating without dislodging the desired portions. When the coating is a light sensitive polymeric material, it has been found that trichlorethylene is preferably used as the developing solvent, although other solvents such as chlorinated, aromatic, or ester solvents, for example, may be used, and the following solvents, by way of example and not limitation, may be utilized:

methylene chloride
dimethyl formamide
trichloroethylene
1,2 - dichloroethane
tetrahydrofuran
methyl ethyl ketone
dimethyl acetamide
methyl acetate
acetone
monochlorobenzene
methyl Cellosolve acetate
dimethyl sulfoxide
ethyl acetate
benzene
furfuryl alcohol
1,4 - dioxane
Cellosolve acetate
toluene
cyclohexanone
xylene
Carbitol acetate
diethyl Carbitol
n-butyl acetate
tetrahydrofurfuryl alcohol
1,1,1 - trichloroethane
methyl isobutyl ketone The solvent supply in reservoir 30 is preferably replenished by recovering the solvent after it drains from the plate within chamber 10 and removing the impurities therefrom. As can best be seen in FIG. 2, the solvent dispersed over the plate will drain from the plate due to gravity and be conducted from chamber 10 through an opening 38 is lower end wall 15 and through pipe, or conduit, 39 to a holding tank 40. As solvent is required in reservoir 30, the dirty solvent, i.e., solvent with impurities therein, is pumped from tank 40, by means of pump 41, through pipe, or conduit, 42 into a still 43 where the solvent is distilled and then passed through pipe, or conduit, 44, water filter 45 and pipe, or conduit, 46 back into clean solvent reservoir 30. In the reservoir the solvent is, of course, heated and is then ready for re-use in developing plates.

A small air door 47, controlled by solenoid 48, is provided at the upper end of chamber 10, preferably in top wall 11, to admit air into the chamber for drying the plate and removing fumes from the chamber. The lower end of the chamber opens into a conduit 49, preferably opening into the chamber through top wall 11, and this conduit leads to an exhaust blower 50, which is operated in conjunction with air door 47 in an open position to cause rapid flow of air through the chamber after the undesired portion of the coating has been removed from the plate by spraying developing solvent thereon.

Since the developing solvent, including trichloroethylene, commonly produces fumes, or vapor, in the chamber, this vapor is mixed with the incoming air and carried from the chamber when blower 50 is operated. To prevent escape of the vapor and to recover solvent, the vapor-containing air from blower 50 is passed through condenser 51 where the vapor is condensed in conventional fashion and conducted through pipe 52 to holding tank 40. The air, after passing through condenser 51, is discharged into the atmosphere. Condenser 51 should have sufficient capacity to substantially completely purge the air so that where the developing solvent is of a type that could be harmful to humans, the air exhausted from the condenser to the atmosphere contains virtually no fumes. It has been found that when utilizing the apparatus of this invention and with trichloroethylene as the developing solvent, no more than 100 parts per million of trichloroethylene is discharged into the atmosphere.

Figures 6, 7:
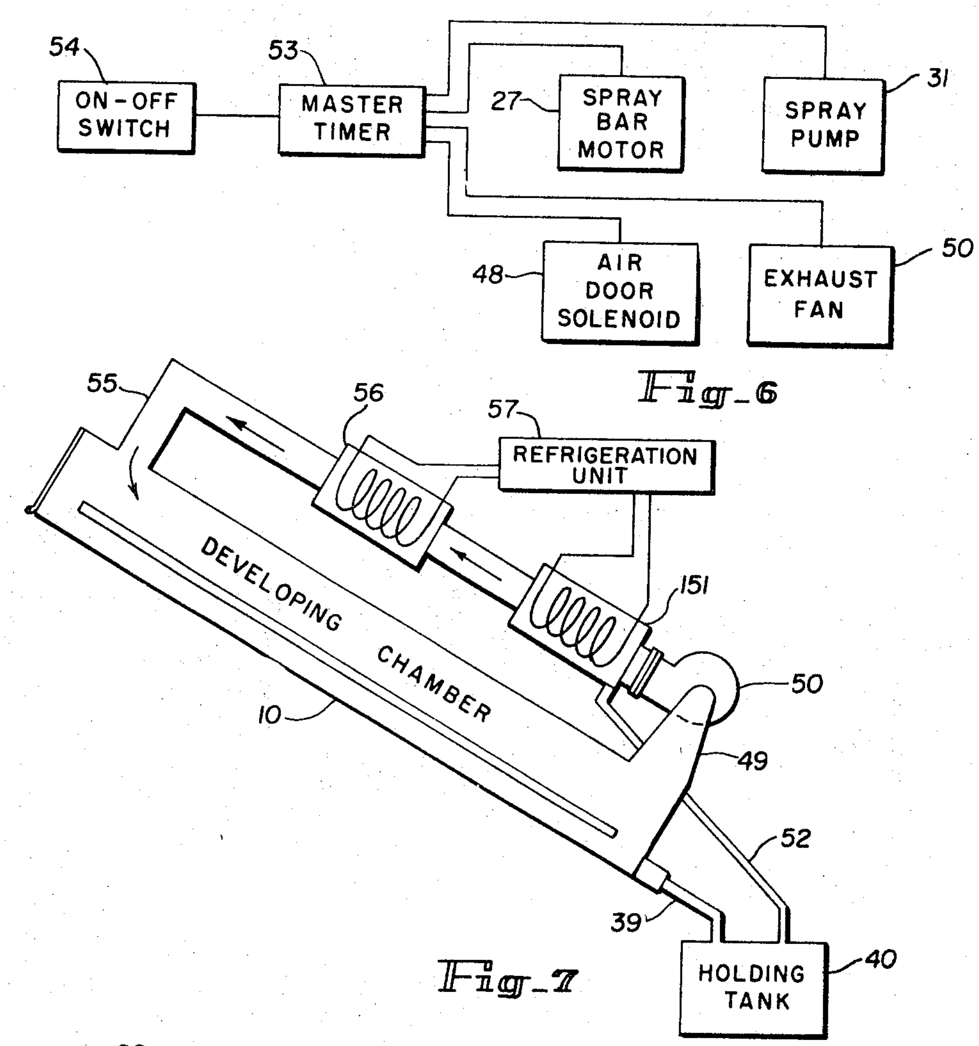
FIG. 6 is a block diagram showing the automatic electrical control system for the developing apparatus shown in FIG. 2.
FIG. 7 is an illustration in schematic form of a completely closed air circulation system which can be used in developing apparatus of FIG. 2.

Developing apparatus 8 is preferably automatically operated to assure uniform developing of plates. As shown in FIG. 6, conventional master timer, or programmer, 53 is provided to control the sequence of operations, and could, for example, include a plurality of rotatable discs (not shown) each of which has one or more arcuate paths with conductive segments thereon the number and length of which depend, of course, on the number and length of time that each controlled element is to be energized.

Each timing cycle is started by closing an OFF-ON switch 54, which switch, for example, can be a conventional push-button switch mounted on the front of processing unit 7, as shown in FIG. 1. At the start of the timing cycle, spray bar drive motor 27 and spray pump 31 are energized to start the movement of spray bar 22 and to start pumping solvent to the spray heads. If desired, a solenoid valve or a pressure switch (not shown) may be provided to prevent spraying of solvent onto the plate until the pressure reaches a predetermined minimum value. If spraying is prevented for any appreciable time, then energization of motor 27 should be delayed with respect to energization of pump 31.

When the spray bar reaches the end of one pass over the lithographic plate within chamber 10 (i.e., reaches a point near door 17 when the pass commences near the lower end wall 15 as is preferable), the spray bar motor 27 and pump 31 are de-energized for a predetermined short period of time and then are again energized to cause the bar to return along essentially the same path to its starting point. This can be accomplished by a limit switch (not shown) tripped by block 23 to reverse direction of motor 27, or if a belt drive is utilized, blocks 23 and 24 could be attached to the drive and be carried in both directions without reversing motor 27 to achieve the same end.

When the spray bar reaches its starting position (preferably near end wall 15), the spray bar drive motor 27 and spray pump 31 are again de-energized for a predetermined short period of time by the master timer and then re-energized to cause an additional two passes over the plate in the same manner as described hereinabove. If the bar is to be reciprocated only twice over the plate (i.e., four passes over the plate), as has been found preferable, spray bar drive motor 27 and spray pump 31 are de-energized after the second reciprocation and not re-energized until the next timing cycle (to develop another plate). Following a dwell period (after the fourth pass of the spray bar when the fourth is the last pass), the timer energizes the air door solenoid 48 and exhaust blower 50. A dump valve (not shown) may also be provided to drain solvent from the spray bar during this period, if desired, to prevent solvent from contacting the plate. The moving air quickly dries the plate and carries the fumes from the chamber. After a predetermined short period of time, the air door is closed by de-energizing solenoid 48 and the exhaust blower 50 is de-energized, after which the developed plate is removed from chamber 10 through door 17.

As shown in FIG. 7, a completely closed air circulation system may be provided, and may be necessary in some cases, to assure that solvent fumes do not escape to the atmosphere. To accomplish this end, a conduit 55 is connected to the upper end of the chamber and opens thereto through the opening where air door 47 was located. Conduit 55 leads to the exhaust side of cooling condenser 151 and preferably includes a heater 56 for heating the air before conducting the same to the chamber. As shown in FIG. 7, cooling condenser 151 and heater 56 can be connected to a refrigeration unit 57 in conventional manner.

After inspection of the plate, the developed plate is desensitized in desensitizing chamber 58 of desensitizing apparatus 9 in processing unit 7.

As shown in FIG. 5, desensitizing apparatus 9 includes an enclosed desensitizing chamber 58 positioned below developing chamber 10. Desensitizing chamber 58 is similar in structure to developing chamber 10 and is formed by top and bottom walls 59 and 60, respectively, a pair of side walls (not shown), lower end wall 63 and door 65 (at the upper end of the chamber) through which the developed lithographic plate can be inserted into and removed from the desensitizing chamber. To position the plate, a plurality of rollers (not shown) like those in developing chamber 10 are positioned on horizontal bars (not shown) in the same manner as described in connection with developing apparatus 8. In addition, while the desensitizing apparatus preferably positions the developed plate inclined with respect to horizontal, as does the developing apparatus, the angle need not be as pronounced, and is preferably about 25° with respect to horizontal. 158

As shown in FIG. 5, the desensitizing apparatus, like the developing apparatus, has a plurality of spray heads 68 mounted on a spray bar 69, which bar is mounted in the chamber in the same manner as described hereinabove with respect to the spray bar in the developing chamber. Spray bar 69 is reciprocated by means of motor 74 and drive 75 in the same manner as described in connection with the developing apparatus.

The desensitizing solvent is supplied to spray bar 69 from a reservoir 76. The solvent is pumped from the reservoir by means of pump 77 having a conduit 78 leading from the reservoir to the pump and tubing 79 (part of which is flexible) with a filter 80 therein leading from the pump to the spray bar. In addition, a pressure gauge 81 may be mounted in conduit 79 for monitoring the pressure, if desired.

When the desensitizing solution utilized is not harmful, as is common with many such solutions, fumes if any, developed in desensitizing chamber 58 may be exhausted directly to the atmosphere through conduit 82, opening into the desensitizing chamber, preferably through the top wall 59, and exhaust blower 83. To replenish the supply of solvent in the reservoir, a conduit 84 opens to the lower end wall 63 of the chamber and leads to the storage reservoir 76. The desensitizing solvent may be, for example, a water solution of oxalic acid, phosphoric acid and glycerin, or chromic acid and gum arabic, with a 1 to 16 percent water solution of oxalic acid being preferred.

The desensitizing process is automatically controlled in the same manner as is the developing process. A desensitizing OFF-ON switch 85 controls the desensitizer master timer, or programmer (not shown). When the cycle starts by closing switch 85, the desensitizer spray bar motor 74 and pump 77 are energized to cause two passes of the spray bar over the plate. When this is accomplished, motor 74 and pump 77 are de-energized, and following a predetermined delay, exhaust blower 83 is energized for a predetermined period of time to exhaust any fumes in the chamber. After the blower is de-energized, the now processed plate is removed from the desensitizing chamber. If desired, a third and fourth pass can be added after a predetermined delay in the same manner and, if desired, the blower can be completely deleted from the desensitizing chamber.

Figure 8:
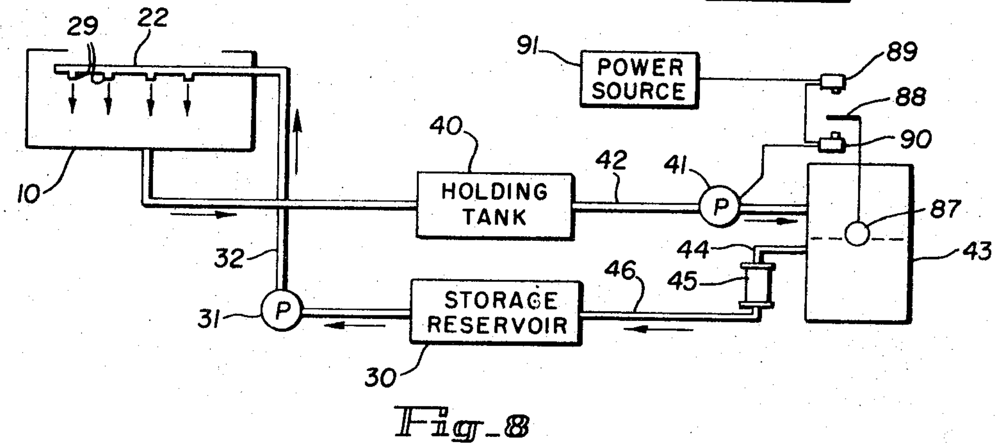
FIG. 8 is a schematic and block diagram illustrating a system for automatic recirculation control for the developing apparatus of this invention shown in FIG. 2.

As shown in FIG. 8, the supply of liquid in reservoir 30 of developing apparatus 8 can be automatically replenished by monitoring the amount of liquid in the still 43, as by a float 87. Float 87 may have an actuator 88 on the end of trip switches 89 and 90, switch 89 being normally closed and switch 90 being normally open. By connecting switches 89 and 90 between the pump 41 and power supply 91, and providing a delayed opening of switch 90 after the same is closed by actuator 88, pump 41 will be energized only as required to maintain the level in still 43 between predetermined limits. When pump 41 is energized, solvent is pumped from the holding tank 40 into the still 43 through conduit 42 (and hence later into reservoir 30 through conduits 44 and 46 and filter 45).

In addition, dividers (not shown) can be placed in reservoir 30 and holding tank 40 so that only a small portion of the solvent in each tank need be heated (for example, 2 and 3 gallons). This would enable the unit to be shut down for periods of time without experiencing considerable delay before the unit is again ready for use.

In operation, a lithographic plate to be developed is placed in the developing chamber with the coated side facing upwardly and the chamber door closed. With the plate thus positioned, OFF-ON switch 54 is depressed to start a timing cycle by master timer 53. At the start of the cycle, spray bar drive motor 27 and spray pump 31 are energized so that a first pass of hot spray is dispersed over the entire lithographic plate to deposit a thin layer thereon. It has been found preferable for each pass of the spray bar to last from 12 to 14 seconds.

After the first pass is completed and the spray bar is at the top end of the chamber (considering the starting point to be at the bottom end) the spray bar motor 27 and pump 31 are de-energized for a predetermined period, preferably 20 seconds. Following this 20-second delay, the timer causes the spray bar motor 27 and pump 31 to again be energized and a second pass of the spray bar is made over the plate, preferably identical in time to the first pass.

When the spray bar reaches its starting position, the spray bar motor 27 and pump 31 are again de-energized for a predetermined period, again preferably 20 seconds. The process is then repeated for a third and fourth pass of the spray bar in the same manner.

When the fourth pass is completed and the spray bar is again in dwell position, the spray bar motor 27 and spray pump 31 are again de-energized. Following a predetermined delay, preferably 30 to 60 seconds, the timer causes exhaust blower 50 and solenoid 48 to be energized, the latter opening air door 47 (except when the closed air circulation system is used and no air door is needed). This causes air to be rapidly moved through the developing chamber to quickly dry the plate and remove the fumes from the chamber. Following purging of the chamber (about 4 to 5 minutes), exhaust blower 50 and solenoid 48 (if used) are de-energized, and the door of the developing tank is opened and the now-developed plate removed.

After inspection of the plate, it is placed in the desensitizing apparatus in the processing unit. When in the desensitizing apparatus, the desensitizing OFF-ON switch 85 is depressed to start the timer and cause spray bar motor 74 and pump 77 to be energized to cause two passes of desensitizing spray to be applied to the plate, each pass preferably lasting approximately 12 to 14 seconds. When the desensitizing spray bar reaches its point of starting, motor 74 and pump 77 are de-energized. After a predetermined delay, preferably of one minute, exhaust blower 83 is energized so that the fumes, if any, are exhausted from the plate or, if no exhaust system is provided, and a third and fourth pass of solvent is desired, the spray bar motor and pump are energized in the same manner as described hereinabove. After the motor and pump are de-energized and the exhaust blower is de-energized (if used), the plate is then removed from the processing unit and is ready for use in printing by the planographic process.

It is to be appreciated, of course, that the particular timing of steps set forth herein is meant to be illustrative only and the invention is not meant to be limited thereto, and that the timing can be varied so long as the surface of the plate being treated remains moist at all times in the cycle until quick drying is accomplished, quick drying being necessary to avoid streaks.

A number of plates have been developed with the apparatus and method of this invention and plates of excellent quality have been obtained with a processing time of less than 8 minutes per plate. Of these, one plate was used to make 1,300,000 high quality impressions before being discarded and the average life of all plates proved to be about 500,000 high quality impressions.

Thus, the improved process and apparatus for developing plates of this invention provide an improved apparatus and process wherein superior quality plates can be quickly processed.

What is claimed is:

1. A method for developing plates having a coating on a surface thereof, portions of which coating are solvent removable, said method comprising: dispersing developing solvent from a solvent reservoir over the coated side of a plate in a developing chamber until the undesired portions of said coating have been removed from the plate by the action of said developing solvent; rapidly drying said plate while in said chamber; removing the plate from the chamber after said plate is dry; removing dissolved impurities from the solvent in situ; and returning the thus purified solvent to the solvent reservoir.

2. The method of claim 1 wherein said plate is dried by passing a flow of air past said plate.

3. The method of claim 1 wherein said developing solvent is heated to a temperature of between 140° and 160° F. before application to said plates.

4. The method of claim 1 wherein said developing solvent is repeatedly substantially uniformly dispersed in a thin layer over the coated side of said plate.

5. The method of claim 4 wherein said developing solvent is dispersed over the coated side of said plate by repeatedly sweeping the plate with a spray of said developing solvent at a substantially uniform rate.

6. The method of claim 4 wherein said plate is inclined, and wherein each said application of solvent is separated by a time interval sufficiently short so that the coated side of said plate remains moist between applications of solvent.

7. A method for developing plates having a light sensitive resist coating on a surface thereof, portions of which coating have been fixed by exposure to light, said method comprising: repeatedly spraying developing solvent drawn from a solvent reservoir over the resist coated side of a plate while said plate is inclined within a closed chamber until all unfixed portions of said resist coating are removed from said plate by the action of said developing solvent, each said application of spray being separated by a time interval sufficiently short so that the resist coated side of said plate remains moist between spray applications; directing a flow of air past the plate to dry the same while in said chamber; removing the dried plate from the chamber; removing the dissolved resist from the solvent; and returning the thus purified solvent to the solvent reservoir.

8. A method for developing plates having a light sensitive resist coating on a surface thereof, portions of which coating have been fixed by exposure to light, said method comprising: dispersing liquid state developing solvent from a clean solvent reservoir over said plate in a closed chamber so that unfixed portions of said resist coating are carried from said plate by said solvent; collecting said solvent in said closed chamber; drying said plate by directing a flow of air through said chamber so that the vapor of said solvent is mixed with said air; recovering said solvent from said vapor-containing air and collecting said solvent; removing the dissolved impurities from said collected solvent; and introducing said solvent with impurities removed therefrom into said clean solvent reservoir.

9. The method of claim 8 wherein said solvent is recovered from said vapor-containing air by passing said air through a condenser, and wherein said impurities are removed from said collected solvent by distilling said solvent and then passing said solvent through a filter.

10. The method of claim 8 wherein said solvent dispersed on said plate is heated by heating said cleaned solvent reservoir to a temperature of between 140° and 160° F.

11. A method for developing lithographic plates having a differential solubility coating thereon, said method comprising: dispersing developing solvent from a solvent reservoir over the coated surface of a lithographic plate in a developing chamber until the more readily soluble portions of the coating have been removed from the plate by said developing solvent; rapidly drying said lithographic plate while in said chamber; removing said lithographic plate from said chamber after said plate is dry; collecting the solvent dispersed onto said plate; removing the dissolved coating from said solvent; and returning the cleaned solvent to said solvent reservoir.

12. A method for processing lithographic plates having a coating on a surface thereof, portions of which coating are solvent-removable, said method comprising: inserting a lithographic plate to be processed into a developing chamber and dispersing developing solvent from a solvent reservoir over the coated side of said lithographic plate until the undesired portions of said coating have been removed from the plate by the action of said developing solvent; collecting the dispersed solvent and removing dissolved impurities therefrom, returning the solvent to said solvent reservoir; rapidly drying said plate while in said developing chamber; removing the plate from the chamber and inspecting the same; inserting said developed plate into a desensitizing chamber and applying desensitizing solvent to said plate; and removing said plate from said desensitizing chamber.

13. The method of claim 12 wherein said developing solvent is trichlorethylene and said desensitizing solvent is a water solution of oxalic acid.

14. The method of claim 12 wherein both said developing solvent and said desensitizing solvent are dispersed on said plate by repeatedly spraying the solvent onto said plate.

* * * * *

UNITED STATES PATENT OFFICE
CERTIFICATE OF CORRECTION

Patent No. 3,660,089 Dated May 2, 1972

Inventor(s) - John E. Pickard

It is certified that error appears in the above-identified patent and that said Letters Patent are hereby corrected as shown below:

Column 8, line 70 after "the" and before "solvent" the words "thus purified" should appear.

Signed and Sealed this

Fifth Day of April 1977

[SEAL]

*Attest:*

RUTH C. MASON
*Attesting Officer*

C. MARSHALL DANN
*Commissioner of Patents and Trademarks*